UNITED STATES PATENT OFFICE.

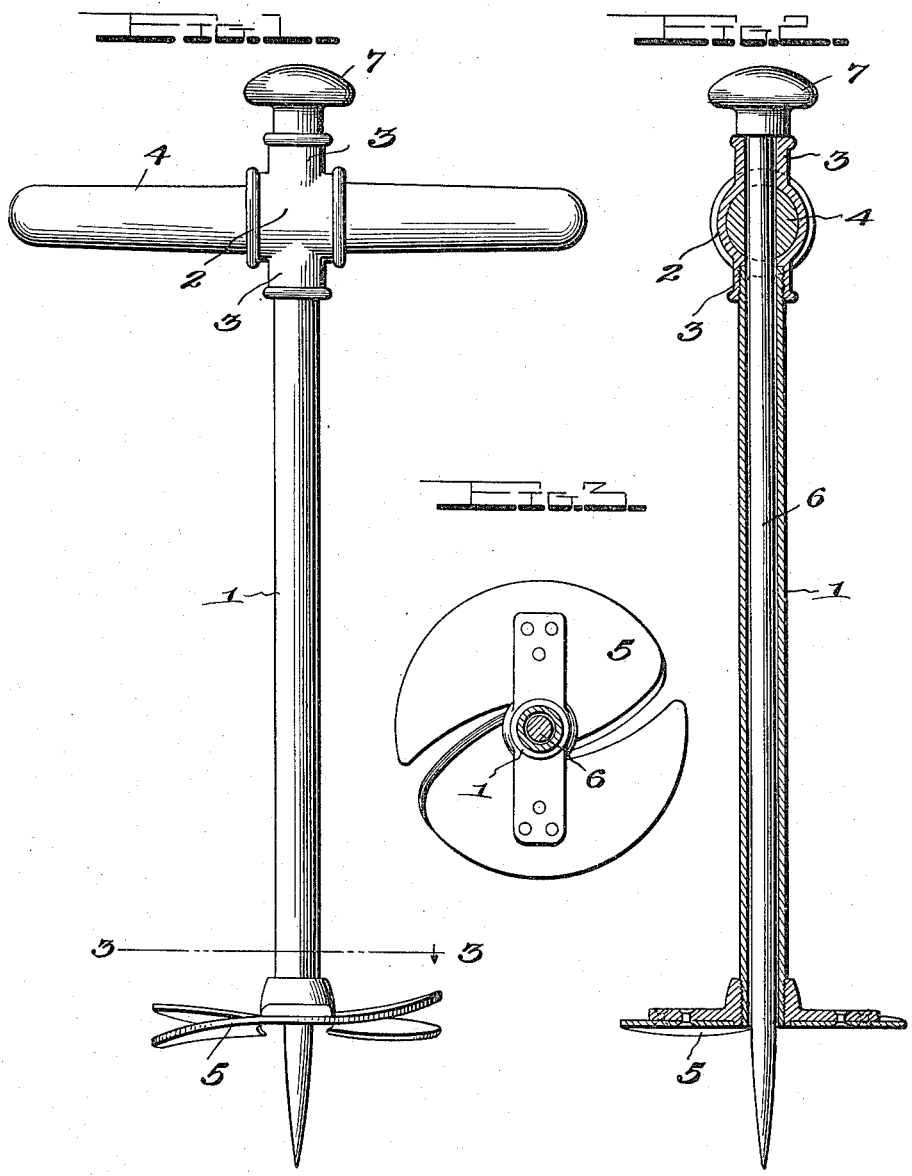

WILLIAM F. SHOLL, OF HUBBELL, NEBRASKA.

EARTH-BORING DEVICE.

1,176,992. Specification of Letters Patent. Patented Mar. 28, 1916.

Application filed December 23, 1915. Serial No. 68,396.

*To all whom it may concern:*

Be it known that I, WILLIAM F. SHOLL, a citizen of the United States, residing at Hubbell, in the county of Thayer and State of Nebraska, have invented certain new and useful Improvements in Earth-Boring Devices, of which the following is a specification.

This invention relates to an earth boring device especially adapted for use as a post hole auger.

The object of the invention is to provide means for advancing a suitable earth loosening point ahead of the cutting blades, said point being entirely independent of said blades.

With this object in view the invention consists of the novel features of construction hereinafter described, pointed out in the claims, and shown in the accompanying drawings, in which:—

Figure 1 is a side elevation. Fig. 2 is a longitudinal section taken at right angles to Fig. 1. Fig. 3 is a section on the line 3—3 of Fig. 1.

In constructing the device I employ a tubular shank 1 and a ferrule 2, said ferrule having extensions 3, one of which engages the upper end of the shank 1. An operating handle 4 passes through the ferrule 2. To the lower end of the shank are secured the usual cutting blades 5. Passing loosely through the ferrule extensions 3, the handle 4 and the shank 1 is a rod 6 the lower end of which is pointed, said pointed end projecting from the lower end of the shank 1. The upper end of the rod 6 carries a knob 7 which normally rests on the upper extension 3. This rod is adapted to work vertically through the handle and shank, having an action similar to that of a crow-bar, and as the blades advance the rod can be lifted and then driven downwardly into the earth in advance of the blades, and during rotation of the blades and handle the rod remains fixed in the earth, forming practically a stationary, vertical shaft on which the shank turns. I am aware of the fact that points have been provided in advance of earth boring augers, but these have turned with the auger, or have been in some manner locked to the shank during the boring operation. The upper extension 3 of the ferrule serves to space the knob 7 from the handle and prevents injury to the hand in operating the rod.

What I claim is:—

1. In an earth boring device, a tubular shank open at each end, cutting blades carried by the shank, an operating handle carried by the shank, a pointed rod resting loosely in the shank and projecting below the shank, and a knob carried by the upper end of the rod.

2. In a device of the kind described, a tubular shank, earth boring devices carried thereby, a ferrule mounted on the upper end of the shank, a handle carried by the ferrule at right angles to the shank, a pointed rod adapted to work through the shank, ferrule and handle, and a knob carried by the upper end of the rod and normally resting on the ferrule.

3. In a device of the kind described, a tubular shank, earth cutting devices carried by the lower end of the shank, a ferrule carried by the upper end of the shank and having an upward extension, a handle passing through the ferrule, a rod passing loosely through the shank, handle and ferrule, and a knob carried by the upper end of the rod and adapted to engage the upward extension of the ferrule.

In testimony whereof I affix my signature in the presence of two witnesses.

WILLIAM F. SHOLL.

Witnesses:
J. E. CONKLIN,
L. A. CONKLIN.

Copies of this patent may be obtained for five cents each, by addressing the "Commissioner of Patents, Washington, D. C."